(12) United States Patent
Legault et al.

(10) Patent No.: US 10,468,864 B2
(45) Date of Patent: *Nov. 5, 2019

(54) OUTLET BOX FOR VERTICAL OR HORIZONTAL MOUNTING

(71) Applicant: Thomas & Betts International LLC, Wilmington, DE (US)

(72) Inventors: Ludovic Legault, Pointe-Claire (CA); Jean-Michel Pelletier, Lacolle (CA)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,819

(22) Filed: Aug. 10, 2018

(65) Prior Publication Data

US 2018/0351337 A1    Dec. 6, 2018

Related U.S. Application Data

(63) Continuation of application No. 15/804,189, filed on Nov. 6, 2017, now Pat. No. 10,079,482.

(60) Provisional application No. 62/423,451, filed on Nov. 17, 2016.

(51) Int. Cl.
    *H02G 3/12* (2006.01)
(52) U.S. Cl.
    CPC ............. *H02G 3/121* (2013.01); *H02G 3/126* (2013.01)
(58) Field of Classification Search
    CPC .................. H02G 3/121; H02G 3/126
    See application file for complete search history.

(56) References Cited

U.S. PATENT DOCUMENTS

| 2,730,261 | A | * | 1/1956 | Tutt | H02G 3/126 220/3.7 |
| 2,757,817 | A | | 8/1956 | Egan | |
| 5,170,014 | A | | 12/1992 | Borsh | |
| 5,600,093 | A | | 2/1997 | Herth et al. | |
| 5,744,753 | A | | 4/1998 | Nattel | |
| 5,773,757 | A | * | 6/1998 | Kenney | H01R 13/60 174/53 |
| 6,164,475 | A | | 12/2000 | Jorgensen | |
| 6,452,813 | B1 | * | 9/2002 | Gretz | H02G 3/126 174/651 |
| 6,756,541 | B1 | | 6/2004 | Mollick et al. | |
| 6,800,806 | B1 | | 10/2004 | Grday | |
| 6,914,187 | B2 | | 7/2005 | Hull et al. | |
| 6,956,168 | B2 | | 10/2005 | Herth | |

(Continued)

*Primary Examiner* — Dhiru R Patel
(74) *Attorney, Agent, or Firm* — Taft Stettinius & Hollister LLP; J. Bruce Schelkopf

(57) ABSTRACT

An outlet box is configured to be installed to a building structure in a new work or an old work. The outlet box includes an outlet box body and a removable flange partially attached to the outlet box body. The outlet box body has a base member, a first longitudinal side wall, a second longitudinal side wall, a first transverse side wall, and a second transverse side wall. The first and second longitudinal side walls and the first and second transverse side walls are integrally connected to the base member and extend upwardly therefrom, defining an outlet box volume therewithin. A plurality of first angled mounting holes and a plurality of second angled mounting holes are defined on an inner surface of one of the first and second longitudinal side walls and an inner surface of one of the first and second transverse side walls, respectively.

14 Claims, 5 Drawing Sheets

(56) References Cited

U.S. PATENT DOCUMENTS

| | | |
|---|---|---|
| 6,956,169 B1 * | 10/2005 | Shotey .................. H02G 3/121 174/50 |
| 7,126,058 B2 | 10/2006 | Herth |
| 7,214,875 B1 | 5/2007 | Gretz |
| 7,307,212 B1 | 12/2007 | Gretz |
| 7,378,590 B1 | 5/2008 | Herth |
| 7,488,891 B1 | 2/2009 | Gretz |
| 7,554,032 B2 | 6/2009 | Herth |
| 8,415,563 B1 | 4/2013 | Shotey et al. |
| 2012/0199374 A1 | 8/2012 | Herth |

* cited by examiner

OUTLET BOX FOR VERTICAL OR HORIZONTAL MOUNTING

CROSS REFERENCE TO RELATED APPLICATION

This application is a continuation of U.S. patent application Ser. No. 15/804,189, filed on Nov. 6, 2017, now issued as U.S. Pat. No. 10,079,482, which claims priority to U.S. Provisional Patent Application No. 62/423,451, filed on Nov. 17, 2016, the contents of which are incorporated herein by reference in its entirety.

FIELD OF THE INVENTION

The present invention relates to outlet boxes, and more particularly, to outlet boxes configured to be mounted to a building structure in both vertical and horizontal mounting orientations.

BACKGROUND OF THE INVENTION

Outlet boxes are widely used in buildings to house electrical components, such as outlets or switches, and electrical wire connections. Currently, various outlet boxes are available for either new work (new building construction) or old work (existing buildings). Generally, new work outlet boxes have one or more protruding extensions, such as flanges, for mounting to building structures, such as studs. However, because of the protruding extensions, these new work outlet boxes cannot be used for old work where a cutout for an outlet box is made within a drywall. Thus, a different type of outlet box is required depending on the type of work application (new or old). Moreover, currently available old work outlet boxes are designed and configured to be mount only in one orientation, for example, either a vertical or horizontal orientation against the building structure.

Accordingly, although various outlet boxes are available currently in the market, further improvements are possible.

SUMMARY OF THE INVENTION

According to an embodiment of the present invention, an outlet box is configured to be installed to a building structure in a new work or an old work. The outlet box includes an outlet box body and a removable flange partially attached to the outlet box body. The outlet box body has a base member, a first longitudinal side wall, a second longitudinal side wall, a first transverse side wall, and a second transverse side wall. The first and second longitudinal side walls and the first and second transverse side walls are integrally connected to the base member and extend upwardly therefrom, defining an outlet box volume therewithin. A plurality of first angled mounting holes and a plurality of second angled mounting holes are defined on an inner surface of one of the first and second longitudinal side walls and an inner surface of one of the first and second transverse side walls, respectively.

These and other aspects of the present invention will be better understood in view of the drawings and following detailed description.

DETAILED DESCRIPTION OF PREFERRED EMBODIMENTS

Figure 1:
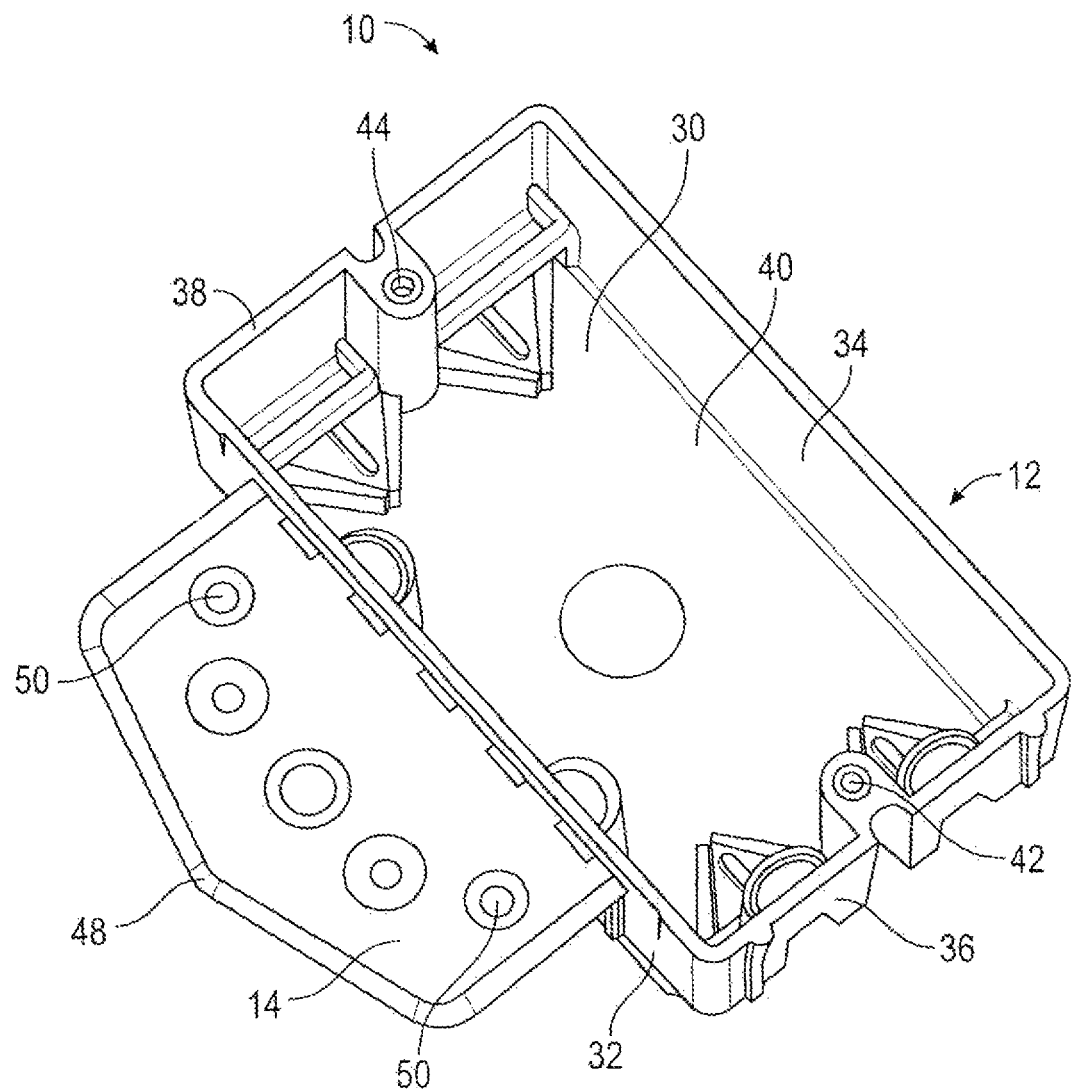
FIG. 1 is a top perspective view of an outlet box, according to an embodiment of the present invention.
Figure 2:
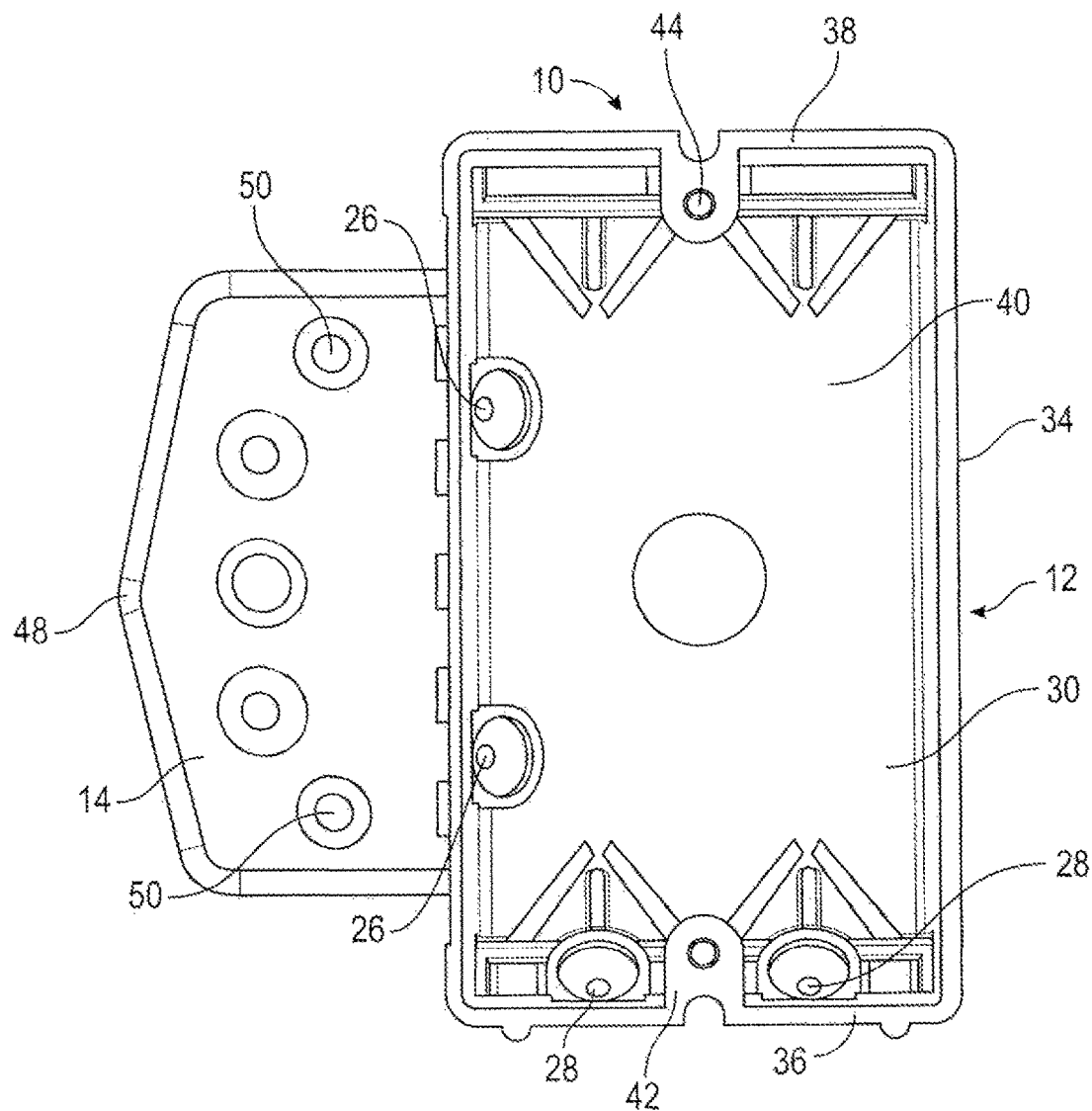
FIG. 2 is a top view of the outlet box in FIG. 1.
Figure 3:
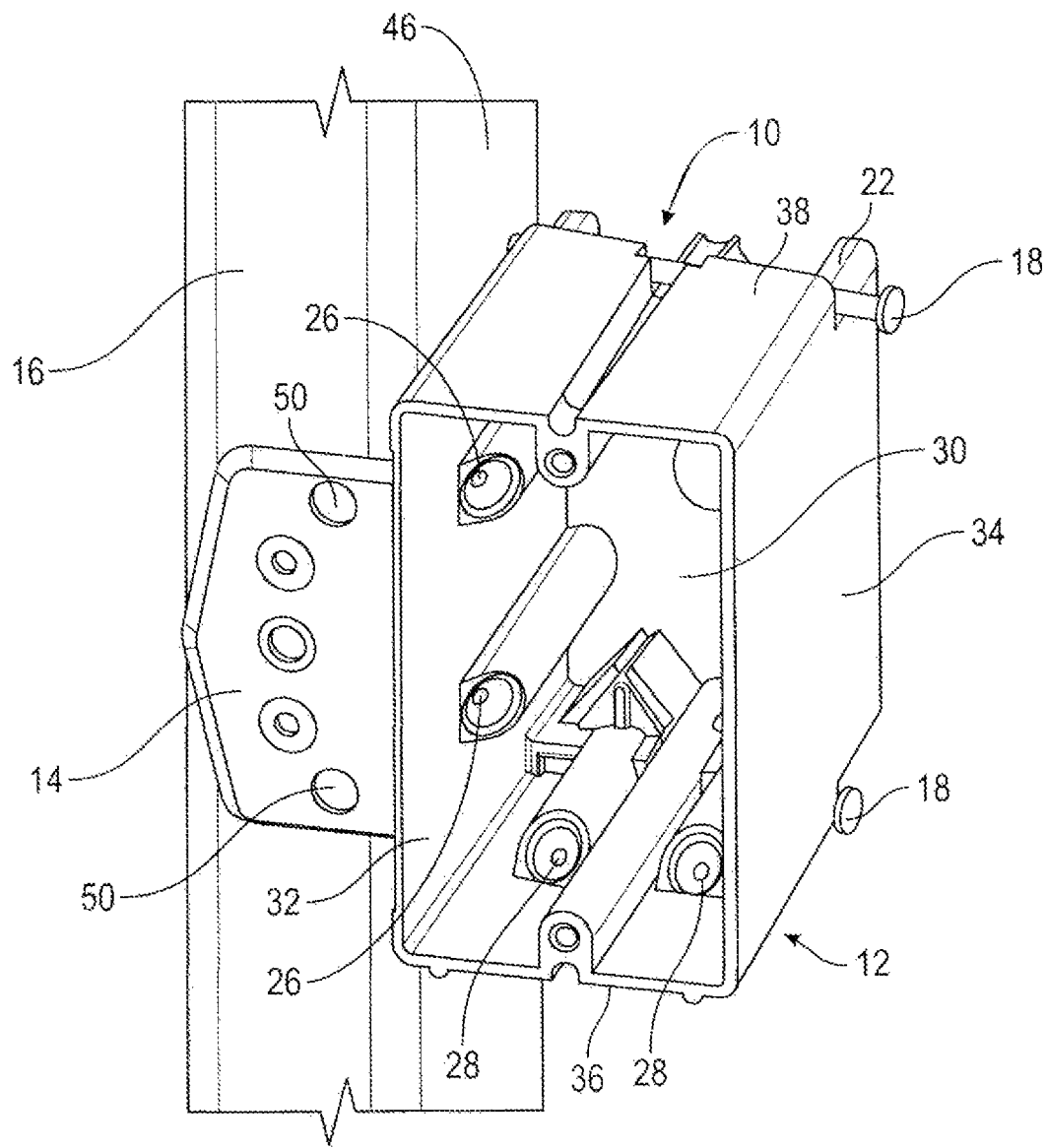
FIG. 3 is a perspective view of the outlet box in FIG. 1, secured to a building structure with nails.

According to an embodiment of the present invention, referring to FIGS. 1-5, an outlet box 10 includes an outlet box body 12 and a removable flange 14 attached to the outlet box body 12. The outlet box 10 is designed and configured to be utilized and installed in both old work applications and new work applications. For new work applications, the outlet box 10 may be secured to a building structure 16, such as a stud, using conventional nails or screws through the removable flange 14 and conventional nails 18 through a plurality of nail guides 22 defined on the outside surface of the outlet box body 12, as shown in FIG. 3. For old work applications, in which a generally rectangular cutout is made within an existing drywall to accommodate the outlet box 10 therewithin, the outlet box 10 may be secured to the building structure 16 using fasteners 24, such as screws, through a plurality of first angled mounting holes 26 for vertical mounting (FIG. 4) or through a plurality of second angled mounting holes 28 for horizontal mounting (FIG. 5), as will be described in more detail below.

Referring again to FIGS. 1 and 2, the outlet box body 12 is generally rectangular in form and includes a back wall or a base member 30, a first longitudinal side wall 32, a second longitudinal side wall 34, a first transverse side wall 36, and a second transverse side wall 38. The first and second longitudinal side walls 32, 34 and the first and second transverse side walls 36, 38 are integrally connected to the base member 30 and extend upwardly therefrom. The first and second longitudinal side walls 32, 34 are opposite and substantially parallel to each other. The first and second transverse side walls 36, 38 are also opposite and substantially parallel to each other. The walls 30, 32, 34, 36, 38 cooperatively define the outlet box volume 40.

Device attachment channels 42, 44 are located within the outlet box volume 40 of the outlet box 10 and integrally formed on each inner surface of the transverse side walls 36, 38. The device attachment channels 42, 44 are bores that extend perpendicular to the base member 30 of the outlet box body 12.

The outlet box body 12 further includes the plurality of first angled mounting holes 26 and the plurality of second angled mounting holes 28 that are integrally formed on the inner surface of the first longitudinal side wall 32 and the inner surface of the first transverse side wall 36, respectively. Alternatively, the plurality of first angled mounting holes 26 and the plurality of second angled mounting holes 28 could be defined on the second longitudinal side wall 34 and the second transverse side wall 38, respectively.

Figure 4:
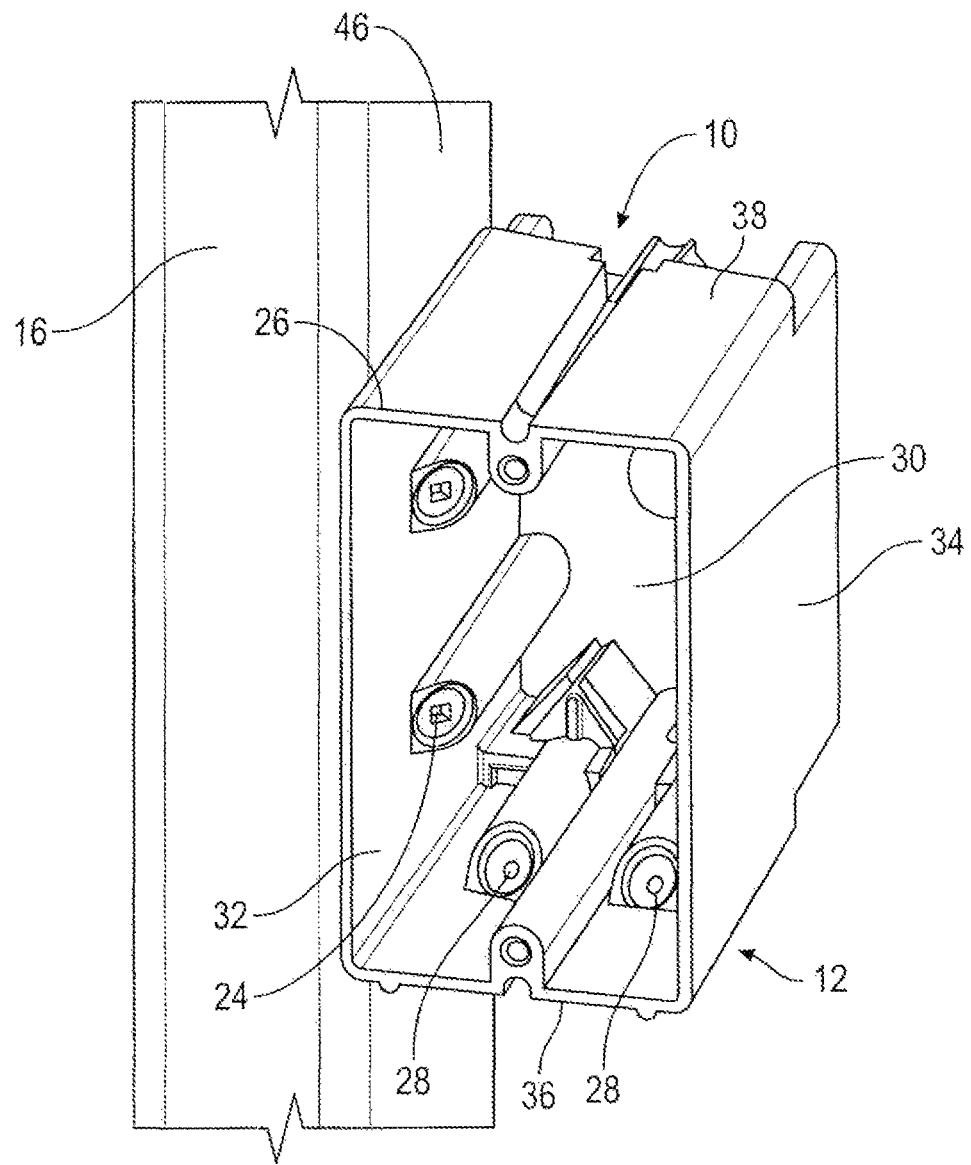
FIG. 4 is a perspective view of the outlet box in FIG. 1 without a flange, secured to a building structure with fasteners in a vertical mounting orientation.
Figure 5:
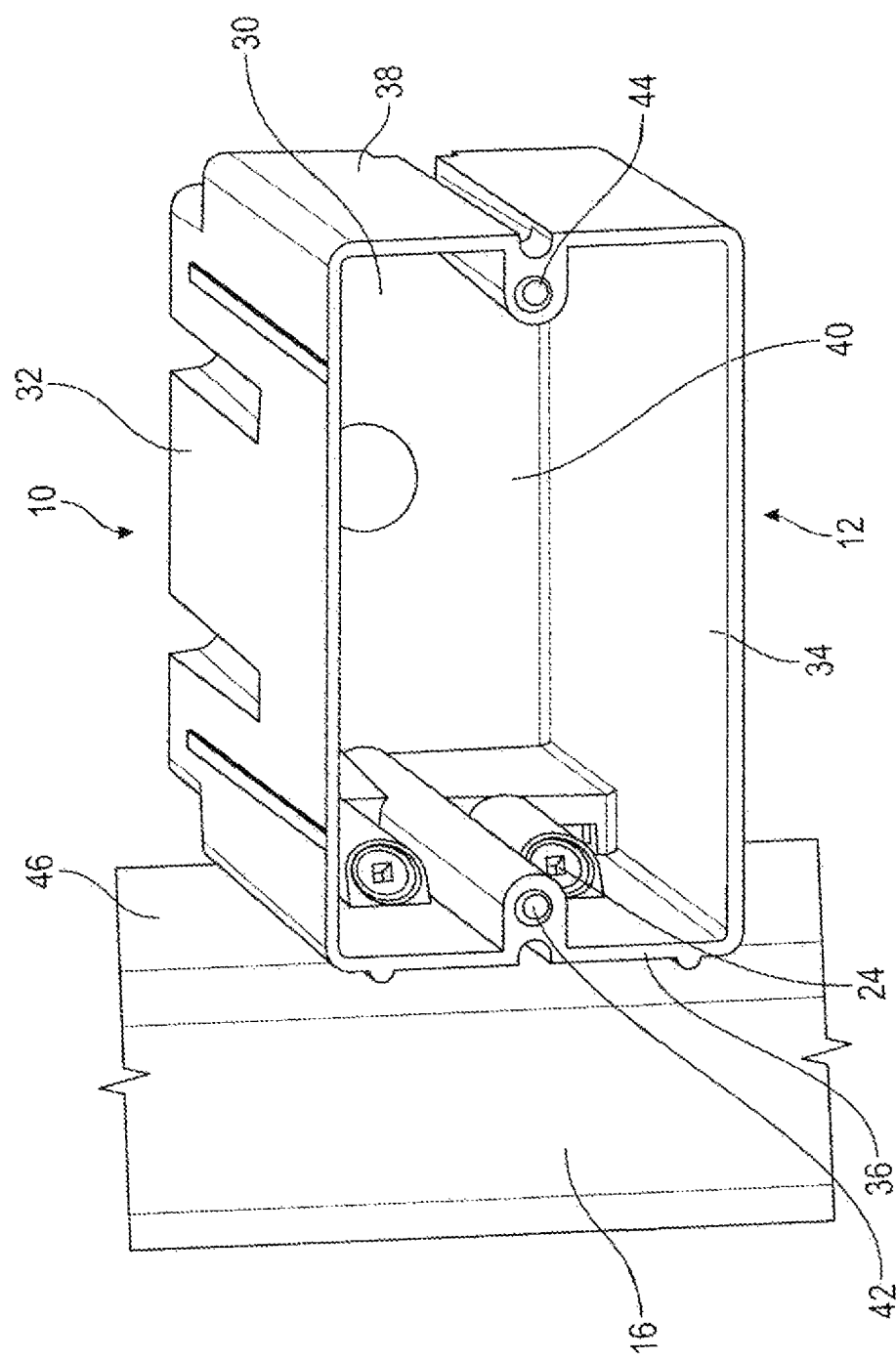
FIG. 5 a perspective view of the outlet box in FIG. 1 without a flange, secured to a building structure with fasteners in a horizontal mounting orientation.

By defining the plurality of first and second angled mounting holes 26, 28 inside the outlet box 10, in old work applications, the outlet box 10 can be secured to the building structure 16 by placing it into the existing cutout in the drywall adjacent to the building structure 16 and inserting the fasteners 24 through the plurality of angled mounting holes 26, 28. More specifically, the fasteners 24 may be inserted through the plurality of first angled mounting holes 26 at an angle relative to the planar surface 46 of the building structure 16 such that the outlet box 10 is in a vertical mounting orientation, as shown in FIG. 4. Alternatively, the fasteners 24 may be inserted through the plurality of second angled mounting holes 28 at an angle relative to the planar surface 46 of the building structure 16 such that the outlet box 10 is in a horizontal mounting orientation, as shown in FIG. 5. Thus, the angle of each of the plurality of first and second angled mounting holes 26, 28 facilitates easy attachment of the outlet box 10 to the building structure 16 in either the vertical or horizontal mounting orientation.

In addition, as stated above, the plurality of first and second angled mounting holes 26, 28 are configured and positioned on the inner surface of one of the longitudinal side walls 32, 34 and the inner surface of one of the transverse side walls 36, 38, such that the outlet box volume 40 is maximized for accommodating appropriate electrical devices and wires associated therewithin. In addition, the plurality of first and second angled mounting holes 26, 28 are positioned to provide enough space to operate a drill or a screwdriver to install the fasteners 24, such as screws.

Referring again to FIGS. 1-3, the removable flange 14, having generally flat surfaces, is partially attached to the first longitudinal side wall 32 of the outlet box body 12 and extends outwardly therefrom. Alternately, the removable flange 14 could be partially attached to the second longitudinal side wall 34. The removable flange 14 defines a plurality of flange holes 50 through which fasteners, such as screws or nails, may be inserted to secure the outlet box 10 to the building structure 16. The removable flange 14 has a generally consistent thickness except for a tapered peripheral portion 48. In the depicted embodiment, the removable flange 14 is arcuate alternately, the removable flange 14 could be in any shape, as deemed suitable for the application.

For new work applications (FIG. 3), the removable flange 14 is kept in place for mounting the outlet box 10 to the building structure 16. However, for old work applications (FIGS. 4 and 5), the outlet box 10 with the removable flange 14 would not fit into the cutout made within the drywall since the removable flange 14 protrudes from the outlet box body 12. Thus, prior to attachment to the building structure 16, the removable flange 14 needs to be severed from the outlet box body 12 by repetitively moving the flange 14 up and down. Once the flange 14 is removed, the outlet box 10 without the flange 14 can be easily fit into the cutout, and thereafter, an installer can facilitate attachment of the outlet box 10 to the building structure 16. Specifically, the outlet box 10 can be secured to the building structure 16 by conventional nails 18 (FIG. 3), as explained above. The plurality of nail guides 22 are defined on the outer portion of the outlet box body 12 to receive nails 18 and allow installation of the outlet box 10 to the building structure 16.

The outlet box body 12 and the removable flange 14 are made out of one or more materials having suitable properties for a desired application, including strength, weight, rigidity, etc. Preferably, the outlet box body 12 and the removable flange 14 are plastic. In addition, the overall design of the outlet box 10 depends on the particular electrical components, such as switches or electrical outlets, to be accommodated therewithin. For example, the outlet box 10 may be one gang, two gang or three gang box that can house one, two or three electrical components, respectively. Preferably, the outlet box is designed and manufactured in one part to reduce assembly costs.

From the foregoing, it will be appreciated that an outlet box according to the present invention allows both a vertical and horizontal mounting orientation, thereby providing easy and convenient mounting of the outlet box to a building structure.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. An outlet box configured to be installed to a building structure in a new work or an old work, the outlet box comprising:
   an outlet box body having a back wall or a base member, a first longitudinal side wall, a second longitudinal side wall, a first transverse side wall, and a second transverse side wall, the first and second longitudinal side walls and the first and second transverse side walls integrally connected to the base member and extend upwardly therefrom, defining an outlet box volume therewithin,
   wherein a plurality of first angled mounting holes and a plurality of second angled mounting holes are integrally formed on an inner surface of one of the first and second longitudinal side walls and an inner surface of one of the first and second transverse side walls, respectively.

2. The outlet box of claim 1, wherein, in the old work, the outlet box could be mounted to the building structure in a vertical mounting orientation by inserting a fastener, such as a screw, through each of the plurality of first angled mounting holes at an angle relative to a planar surface of the building structure.

3. The outlet box of claim 1, wherein, in the old work, the outlet box could be mounted to the building structure in a horizontal mounting orientation by inserting a fastener, such as a screw, through each of the plurality of second angled mounting holes at an angle relative to a planar surface of the building structure.

4. The outlet box of claim 1, wherein a plurality of nail guides are defined on the outside surface of the outlet box to receive nails and allow installation of the outlet box to the building structure.

5. The outlet box of claim 1, wherein device attachment channels are integrally formed on an inner surface of each transverse side wall.

6. The outlet box of claim 5, wherein the device attachment channels are bores that extend perpendicular to the base member of the outlet box.

7. The outlet box of claim 1, wherein the first and second longitudinal side walls are opposite and substantially parallel to each other.

8. The outlet box of claim 1, wherein the first and second transverse side walls are opposite and substantially parallel to each other.

9. The outlet box of claim 1, wherein the outlet box further comprises a removable flange partially attached to, and extending outwardly from, one of the first and second longitudinal side walls.

10. The outlet box of claim 9, wherein the removable flange defines a plurality of flange holes through which fasteners, such as screws or nails, may be inserted to secure the outlet box to the building structure in the new work.

11. The outlet box of claim 9, wherein the removable flange could be severed from the outlet box body by repetitively moving the flange up and down.

12. The outlet box of claim 9, wherein the removable flange is generally rectangular in form.

13. The outlet box of claim 1, wherein the outlet box is made out of plastic.

14. The outlet box of claim 1, wherein the outlet box is designed and manufactured in one part to reduce assembly costs.

* * * * *